(12) United States Patent
Ogasahara

(10) Patent No.: US 8,525,905 B2
(45) Date of Patent: Sep. 3, 2013

(54) SOLID-STATE IMAGING DEVICE, COLOR FILTER ARRANGEMENT METHOD THEREFOR AND IMAGE RECORDING APPARATUS

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 158 days.

(21) Appl. No.: 13/040,718

(22) Filed: Mar. 4, 2011

(65) Prior Publication Data

US 2011/0234865 A1 Sep. 29, 2011

(30) Foreign Application Priority Data

Mar. 25, 2010 (JP) ................................. 2010-069934

(51) Int. Cl.
  *H04N 9/083* (2006.01)
  *H04N 3/14* (2006.01)
  *H04N 5/335* (2011.01)
  *H04N 9/04* (2006.01)

(52) U.S. Cl.
  USPC ........................................................ 348/279

(58) Field of Classification Search
  USPC ................................................ 348/272–280
  See application file for complete search history.

(56) References Cited

U.S. PATENT DOCUMENTS

| | | | |
|---|---|---|---|
| 3,971,065 A | 7/1976 | Bayer | |
| 6,771,314 B1 * | 8/2004 | Bawolek et al. | 348/272 |
| 7,714,916 B2 * | 5/2010 | Tatani | 348/273 |
| 7,903,157 B2 * | 3/2011 | Takada et al. | 348/278 |
| 2007/0296840 A1 * | 12/2007 | Takada et al. | 348/272 |
| 2011/0149126 A1 * | 6/2011 | Mitsui et al. | 348/278 |

FOREIGN PATENT DOCUMENTS

CN  101098414 A  1/2008

OTHER PUBLICATIONS

U.S. Appl. No. 13/047,119, filed Mar. 14, 2011, Ogasahara.
U.S. Appl. No. 13/421,271, filed Mar. 15, 2012, Ogasahara.
Chinese Office Action issued on Apr. 1, 2013, in Chinese Patent Application No. 2011100535991 (with English Translation).

* cited by examiner

*Primary Examiner* — Aung S Moe
*Assistant Examiner* — Chriss Yoder, III
(74) *Attorney, Agent, or Firm* — Oblon, Spivak, McClelland, Maier & Neustadt, L.L.P.

(57) ABSTRACT

According to one embodiment, in a solid-state imaging device having color pixels in which color filters are arranged for respective pixels, two blocks of two pixels in the row direction×two pixels in the column direction of an X1 color are arranged on one diagonal line, and a block of two pixels in the row direction×two pixels in the column direction of one of an X2 color and an X3 color and a block of two pixels of the other color and two pixels of an X4 color arranged diagonally are arranged on the other diagonal line, and magnitudes of wavelengths satisfy the following relationship: X3 color<X1 color<X4 color<X2 color.

4 Claims, 6 Drawing Sheets

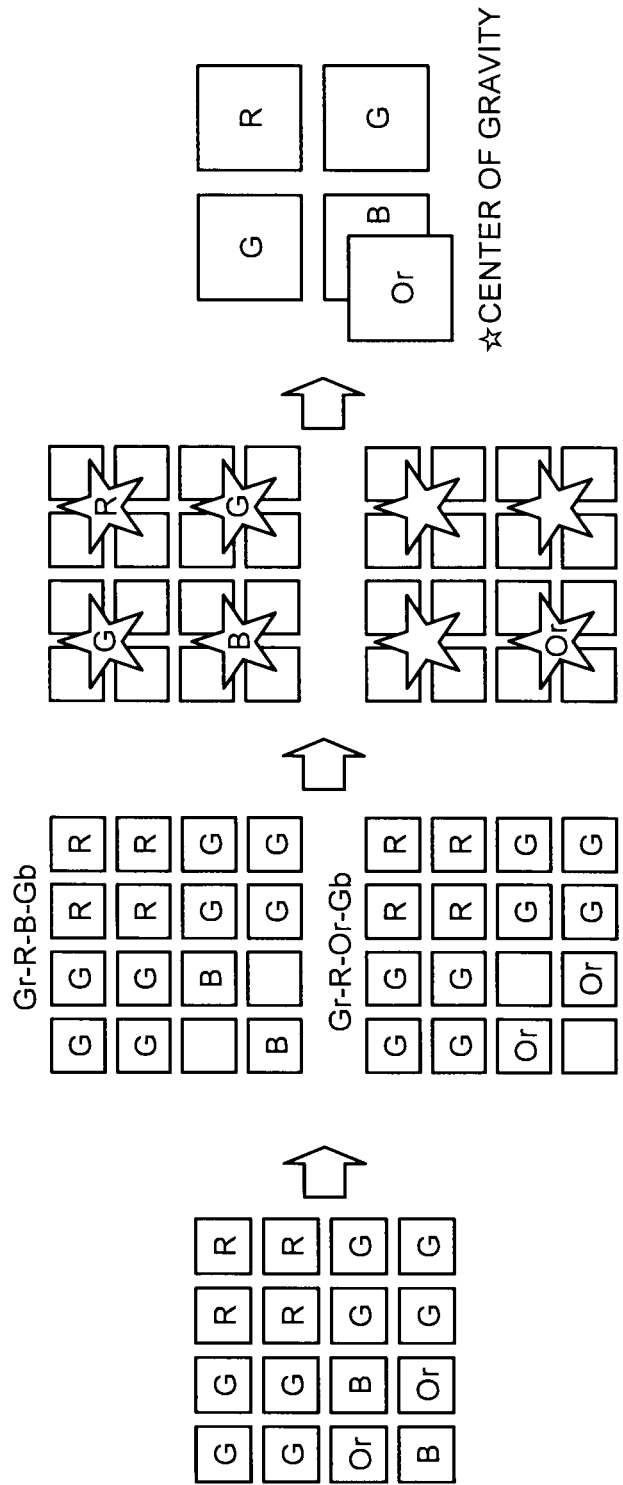

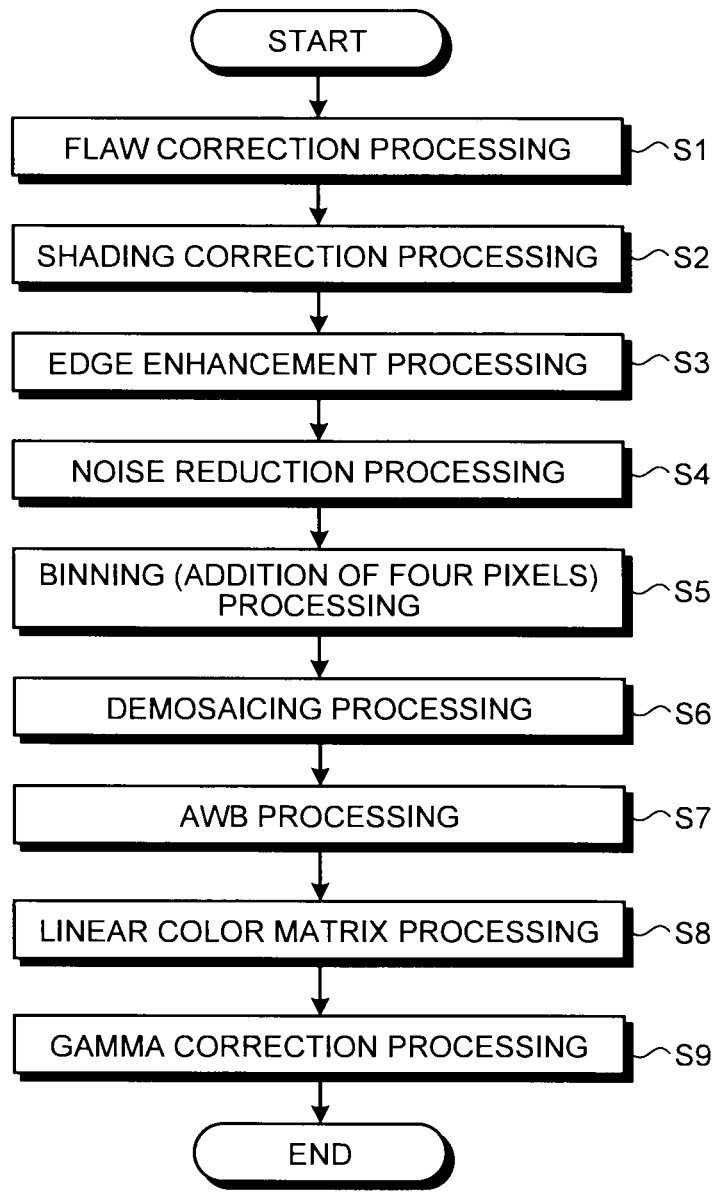

FIG.7A

| G | G | R | R |
|---|---|---|---|
| G | G | R | R |
| B | Or | G | G |
| Or | B | G | G |

FIG.7B

| G | G | Or | B |
|---|---|---|---|
| G | G | B | Or |
| R | R | G | G |
| R | R | G | G |

FIG.7C

| G | G | B | B |
|---|---|---|---|
| G | G | B | B |
| Or | R | G | G |
| R | Or | G | G |

FIG.7D

| R | R | G | G |
|---|---|---|---|
| R | R | G | G |
| G | G | Or | B |
| G | G | B | Or |

FIG.7E

| G | G | R | R |
|---|---|---|---|
| G | G | R | R |
| X | B | G | G |
| B | X | G | G |

US 8,525,905 B2

SOLID-STATE IMAGING DEVICE, COLOR FILTER ARRANGEMENT METHOD THEREFOR AND IMAGE RECORDING APPARATUS

CROSS-REFERENCE TO RELATED APPLICATIONS

This application is based upon and claims the benefit of priority from Japanese Patent Application No. 2010-069934, filed on Mar. 25, 2010; the entire contents of which are incorporated herein by reference.

FIELD

Embodiments described herein relate generally to a solid-state imaging device, a color filter arrangement method therefor, and an image recording apparatus.

BACKGROUND

Solid-state imaging devices are widely used in various fields as elementary elements for performing image input processing. Currently, solid-state imaging devices which are in general use are roughly classified as either CCD image sensors or CMOS image sensors. The principle of a CMOS image sensor is to amplify output of a photodiode functioning as a photo detector provided for each individual pixel by a MOS transistor and obtain the amplified output. The CMOS image sensors as small solid-state imaging devices driven with low power consumption are regarded as promising. In such a solid-state imaging device, each pixel is being made finer and finer and the number of pixels is being increased.

In a solid-state imaging device, specific color filters for respective pixels such as color filters of R (red), G (green), and B (blue) are provided. The solid-state imaging device generally adopts a color filter array called the Bayer array (see, for example, U.S. Pat. No. 3,971,065).

However, if binning processing (pixel addition) to increase sensitivity is performed on the Bayer array in a situation in which illuminance is low and sufficient sensitivity cannot be obtained from one pixel, the resolution may become lower or color reproducibility may worsen in an environment of low color temperature.

BRIEF DESCRIPTION OF THE DRAWINGS

FIG. 4 is a diagram illustrating a case where binning processing is performed on the filter array of the present embodiment;
FIG. 6 is a flowchart showing the flow of signal processing by an image processing device;
and
FIGS. 7A to 7E are diagrams illustrating modifications of the color filter array of the present embodiment.

DETAILED DESCRIPTION

In general, according to one embodiment, in a solid-state imaging device having color pixels in which color filters are arranged for respective pixels, two blocks of two pixels in a row direction×two pixels in a column direction of an X1 color are arranged on one diagonal line, a block of two pixels in the row direction×two pixels in the column direction of one of an X2 color and an X3 color and a block of two pixels of the other color and two pixels of an X4 color arranged diagonally are arranged on the other diagonal line, and magnitudes of wavelengths satisfy the following relationship: X3 color<X1 color<X4 color<X2 color.

A solid-state imaging device according to the present embodiment, a color filter arrangement method therefor, and an image recording apparatus will be described in detail with reference to appended drawings. The present invention is not limited to the following embodiment.

Figure 1:
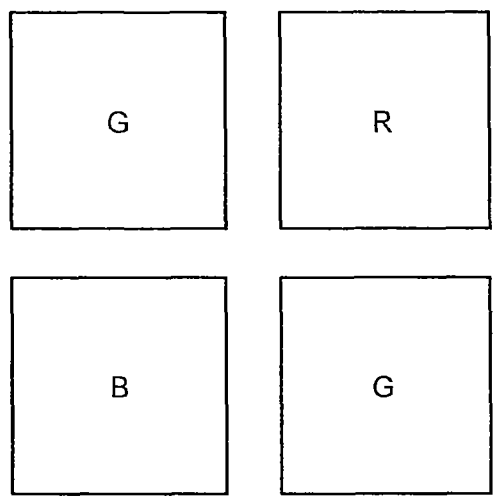
FIG. 1 is a diagram showing the Bayer array.
Figure 2:
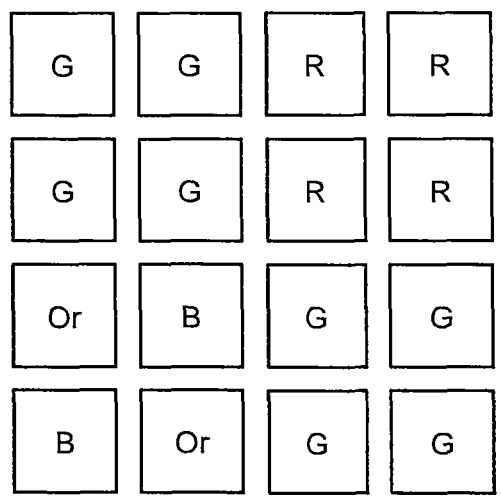
FIG. 2 is a diagram showing a color filter array of the present embodiment.
Figure 3A:
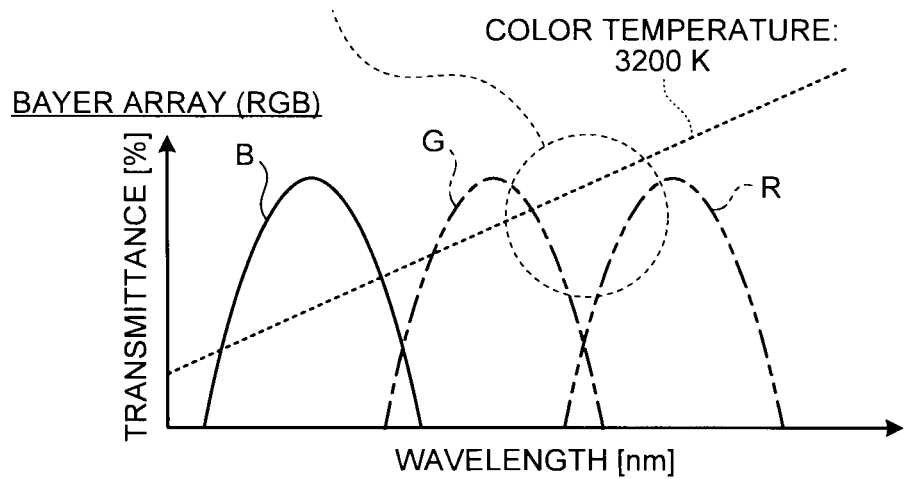
FIGS. 3A and 3B are graphs showing transmittance of color filters.
Figure 3B:
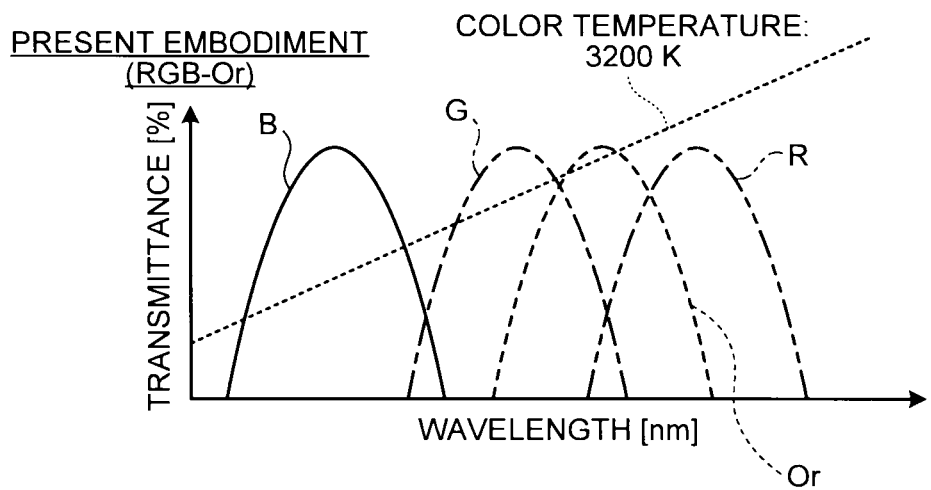

A color filter array (CFA) of a solid-state imaging device according to the present embodiment will be described with reference to FIGS. 1 to 4. The solid-state imaging device according to the present embodiment is a CMOS imaging device or a CCD imaging device. FIG. 1 is a diagram showing the Bayer array. FIG. 2 is a diagram showing the color filter array of the present embodiment. FIGS. 3A and 3B show graphs showing transmittance of color filters, in which FIG. 3A shows a case of the Bayer array and FIG. 3B shows a case of the color filter array of the present embodiment. In FIGS. 3A and 3B, the horizontal axis denotes the wavelength [nm] and the vertical axis denotes the transmittance [%].

As shown in FIG. 1, the Bayer array is a color filter array in which a basic block of two pixels in the row direction (horizontal direction)×two pixels in the column direction (vertical direction) is periodically arranged. In this basic block, two G (green) pixels are arranged on one diagonal line and an R (red) pixel and a B (blue) pixel are arranged on the other diagonal line.

The Bayer array has a problem of lower resolution or degraded color reproducibility in an environment of lower color temperature if binning processing (pixel addition) is performed in a situation in which illuminance is low and sufficient sensitivity cannot be obtained from one pixel. R, G, and B filters used in the Bayer array have wavelength-transmittance characteristics as shown in FIG. 3A. If, for example, the color temperature is low (3200 K), sampling points between G and R are insufficient, leading to lower sensitivity.

By contrast, a color filter array of the present embodiment has, as shown in FIG. 2, a basic block of four pixels in the row direction×four pixels in the column direction arranged periodically therein. In this basic block, two blocks of two pixels in the row direction×two pixels in the column direction of G are arranged on one diagonal line. On the other diagonal line, a block of two pixels in the row direction×two pixels in the column direction of R and a block of two B pixels and two Or (orange) pixels both arranged diagonally are arranged.

R, G, B, and Or filters in the present embodiment have wavelength-transmittance characteristics as shown in FIG. 3B. The Or filter has the peak transmittance in the range of 550 nm to 610 nm and can improve color reproducibility by adding one sampling point in a long wavelength region by adding Or pixels so that sufficient sensitivity can be obtained when the illumination is low.

FIG. 4 is a diagram illustrating a case where binning processing is performed using the filter array of the present embodiment. Here, a case where two pixels in the row direction×two pixels in the column direction are added will be described. Binning processing is performed for a region of low illuminance where sufficient sensitivity is not obtained from one pixel, for example.

In the color filter array of the present embodiment, when four pixels of the same colors of R and G are added (two pixels are added for B and Or), the center of gravity is not shifted, as shown in FIG. 4, and thus, there is no need of interpolation processing or the like and added values can be used without any change. Therefore, degradation in resolution can be avoided, and because the array obtained after four pixels being added is approximately equivalent to the Bayer array, complex signal processing is not needed.

On the other hand, even if Or pixels are added, degradation in resolution can be avoided because the numbers of G and R significantly affecting visual sensitivity are equivalent to those of the Bayer array.

According to the solid-state imaging device of the present embodiment, as described above, two blocks of two pixels in the row direction×two pixels in the column direction of G pixels are arranged on one diagonal line, and a block of two pixels in the row direction×two pixels in the column direction of R pixels and a block of two B pixels and two Or pixels both arranged diagonally are arranged on the other diagonal line. Thus, a highly sensitive image of excellent color reproducibility independent of the color temperature can be obtained in a region of low illuminance.

Figure 5:
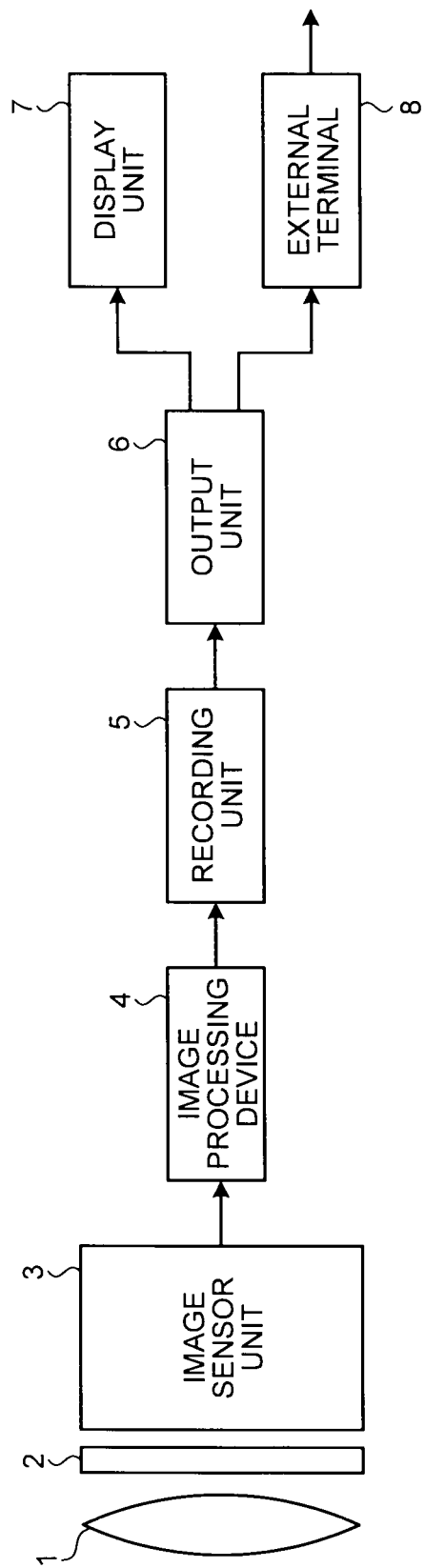
FIG. 5 is a block diagram showing one example of the configuration of an image recording apparatus in which a solid-state imaging device of the present embodiment is mounted.

FIG. 5 is a block diagram showing one example of the configuration of an image recording apparatus in which a solid-state imaging device of the present embodiment is mounted. The image recording apparatus is, for example, a mobile phone with a camera or a digital camera. As shown in FIG. 5, the image recording apparatus includes an imaging lens 1, an IR cut filter 2, an image sensor unit 3 to which a solid-state imaging device of the present embodiment is applied, an image processing device 4, a recording unit 5, an output unit 6, a display unit 7, and an external terminal 8. While the image sensor unit 3 and the image processing device 4 are provided separately herein, the image sensor unit 3 may be configured to include the image processing device 4.

In FIG. 5, the imaging lens 1 serves as an optical system to collects light from an object and forms an image of the object in the image sensor unit 3. The IR cut filter 2 removes infrared light from the light collected by the imaging lens 1. The image sensor unit 3 captures an image of the object by converting the light collected by the imaging lens 1 into signal charges and outputs as an image signal to the image processing device 4.

More specifically, the image sensor unit 3 generates an analog image signal by taking pixels values of R, G, B, and Or in the order corresponding to the color filter array and sequentially amplifies the analog image signal by the gain in accordance with imaging conditions. Further, the image sensor unit 3 converts the obtained image signal from an analog form into a digital form.

The image processing device 4 performs various kinds of processing on the digital image signal input from the image sensor unit 3 and outputs the processed digital image signal to the recording unit 5. The recording unit 5 records the image signal input from the image processing device 4 in a memory or a recording medium. The output unit 6 outputs the image signal recorded in the recording unit 5 to the display unit 7 or the external terminal 8. The display unit 7 is, for example, an LCD, an organic EL display, or a LED display.

FIG. 6 is a flowchart showing one example of the flow of signal processing by the image processing device 4. The image processing device 4 includes a processing unit to perform binning processing (addition of four adjacent pixels of the same color). In FIG. 6, first in step S1, a correction is made to make missing pixels inconspicuous to prevent image degradation due to pixel defects generated when the image sensor is manufactured (flaw correction processing).

In step S2, luminance unevenness caused by a difference in light quantity between the center and periphery caused by the imaging lens 1 is corrected (shading correction processing). In step S3, edge enhancement processing is performed using correction coefficients calculated based on the imaging conditions of the image sensor unit 3 and the position of each pixel.

In step S4, noise such as fixed pattern noise, dark current noise, and short noise is removed (noise reduction processing). In step S5, binning processing of adding four adjacent pixels of the same color is performed. When the size of an output image is a predetermined size, the binning processing is performed if the output image is output in a ¼ size (½ both vertically and horizontally) with respect to the number of effective pixels, for example. The binning processing is also performed if the processing is determined to be necessary as a result of determining whether to perform the binning processing based on various conditions. For example, since the analog gain increases when illuminance is low, and the binning processing is performed if the gain value exceeds a predetermined value.

In step S6, image interpolation processing (demosaicing processing) is performed on the digital image signal transmitted in the order of the color filter array. In the demosaicing, the sensitivity level value of any insufficient color component is generated by interpolation processing of an image signal obtained by capturing an object image.

In step S7, the white balance of the image is automatically adjusted (Automatic White Balance control: AWB). In step S8, linear color matrix processing as shown in Formula (1) below to obtain color reproducibility is performed.

$$\begin{pmatrix} R \\ G \\ B \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \end{pmatrix} \begin{pmatrix} R_0 \\ G_0 \\ B_0 \\ Or_0 \end{pmatrix} \quad (1)$$

Here, color reproducibility is enhanced and at the same time, conversion processing of a color signal from four colors RGBOr to three colors RGB is performed.

In step S9, the color saturation and brightness of an image displayed on a display or the like are corrected by gamma correction processing. The procedure of the series of processing described in the present embodiment is only an example and other processing may be added, processing that can be omitted may be omitted, or the order may be changed if appropriate.

The color filter array of the present embodiment is not limited to the configuration in FIG. 2 and modes shown below may be adopted. FIGS. 7A to 7E are diagrams illustrating modifications of the color filter array according to the present embodiment. As shown in FIG. 7A, Or pixels and B pixels may be interchanged. Alternatively, as shown in FIG. 7B, the blocks may be arranged such that the block composed of Or pixels and B pixels is arranged diagonally above while the block composed of R pixels is arranged diagonally below. Alternatively, as shown in FIG. 7C, B pixels and R pixels may be interchanged. Alternatively, as shown in FIG. 7D, two blocks of G pixels, and the block of R pixels and the block of Or pixels and B pixels may be interchanged.

Further, as shown in FIG. 7E, an X color whose peak of the wavelength transmittance is different from that of R, G, and B, for example, C (cyan), M (magenta), or Y (yellow) may be arranged instead of Or. Accordingly, by adding a sampling point in the wavelength region of the X color, color reproducibility can be improved and sufficient sensitivity can be obtained when the illumination is low.

Specifically, according to the present embodiment, an effect of the present embodiment can be produced by adopting a configuration in which two blocks of two pixels in the row direction×two pixels in the column direction of G pixels are arranged on one diagonal line and a block of two pixels in the row direction×two pixels in the column direction of one of R and B and a block of two pixels of the other color and two pixels of a color whose peak of the wavelength transmittance is different from that of R, G, and B arranged diagonally are arranged on the other diagonal line.

The present embodiment can be generalized as follows: in a solid-state imaging device having color pixels in which color filters are arranged for respective pixels, two blocks of two pixels in the row direction×two pixels in the column direction of an X1 color are arranged on one diagonal line, a block of two pixels in the row direction×two pixels in the column direction of one of an X2 color and an X3 color and a block of two pixels of the other color and two pixels of an X4 color arranged diagonally are arranged on the other diagonal line, and magnitudes of wavelengths satisfy the following relationship: X3 color<X1 color<X4 color<X2 color. In the above example, the X1 color is green, the X2 color red, the X3 color blue, and the X4 color orange.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   color pixels in which color filters are arranged for respective pixels,
   wherein the color filters are configured of four filters of red, green, blue, and orange,
   two blocks of two pixels in a row direction×two pixels in a column direction of green are arranged on one diagonal line, and
   a block of two pixels in the row direction×two pixels in the column direction of red and a block of two pixels of blue and two pixels of orange are arranged diagonally.

2. A color filter arrangement method for a solid state imaging device comprising color pixels in which color filters are arranged for respective pixels, the color filters are configured of four filters of red, green, blue, and orange, the method comprising:
   arranging two blocks of two pixels in a row direction×two pixels in a column direction of green on one diagonal line; and
   arranging a block of two pixels in the row direction×two pixels in the column direction of red and a block of two pixels of blue and two pixels of orange diagonally on the other diagonal line.

3. An image recording apparatus comprising:
   a solid-state imaging device comprising color pixels in which color filters are arranged for respective pixels, the color filters are configured of four filters of red, green, blue, and orange; and
   an image processing device, wherein
   in the solid-state imaging device:
   two blocks of two pixels in a row direction×two pixels in a column direction of green are arranged on one diagonal line,
   a block of two pixels in the row direction×two pixels in the column direction of red and a block of two pixels of blue and two pixels of orange arranged diagonally are arranged on the other diagonal line, and
   the image processing device includes:
   a processing unit that adds four adjacent pixels of a same color of an image signal output from the solid-state imaging device.

4. The image recording apparatus according to claim 3, further comprising:
   a recording unit that records the image signal processed by the image processing device; and
   an output unit that outputs the image signal recorded in the recording unit to at least one of a display unit and an external terminal.

* * * * *